(12) United States Patent
Jung et al.

(10) Patent No.: US 12,555,861 B2
(45) Date of Patent: Feb. 17, 2026

(54) AUTOMATIC SUPPLY SYSTEM OF BOLT AND NUT FOR BATTERY PACK ASSEMBLY

(71) Applicant: LG ENERGY SOLUTION, LTD., Seoul (KR)

(72) Inventors: In Seop Jung, Daejeon (KR); Cheol Yung Kim, Daejeon (KR); Ju Young Lee, Daejeon (KR); Seung Kyun Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 716 days.

(21) Appl. No.: 17/790,812

(22) PCT Filed: Jun. 1, 2021

(86) PCT No.: PCT/KR2021/006799
§ 371 (c)(1),
(2) Date: Jul. 5, 2022

(87) PCT Pub. No.: WO2021/246753
PCT Pub. Date: Dec. 9, 2021

(65) Prior Publication Data
US 2022/0376344 A1    Nov. 24, 2022

(30) Foreign Application Priority Data

Jun. 2, 2020 (KR) .................. 10-2020-0066466

(51) Int. Cl.
*H01M 50/262* (2021.01)
(52) U.S. Cl.
CPC ................ *H01M 50/262* (2021.01)
(58) Field of Classification Search
CPC .......... B65G 27/02; B65G 47/1407; B65G 47/1421; B65G 47/145; B65G 47/1478;
(Continued)

(56) References Cited

U.S. PATENT DOCUMENTS 3,592,336 A * 7/1971 Thurston ............... B65B 37/04
221/156
4,383,359 A * 5/1983 Suzuki ................. B23P 19/004
29/742
(Continued)

FOREIGN PATENT DOCUMENTS

CN    103387128 A    11/2013
CN    204453756 U    7/2015
(Continued)

OTHER PUBLICATIONS

CN-106271574-A machine translation from FIT database (Year: 2025).*
(Continued)

*Primary Examiner* — Jeffrey T Carley
*Assistant Examiner* — Joshua D Anderson
(74) *Attorney, Agent, or Firm* — Birch, Stewart, Kolasch & Birch, LLP

(57) ABSTRACT

An automatic bolt and nut supply system is configured to automatically supply bolts and nuts necessary for each step as much as necessary by type at the time of assembly of a battery pack, the automatic bolt and nut supply system including a plurality of feeders configured to store and supply the bolts and the nuts by type, a conveyance unit configured to convey the bolts and the nuts supplied from the feeders, a reception box configured to receive the bolts and the nuts conveyed by the conveyance unit, and a reception box transfer unit configured to transfer the reception box.

10 Claims, 5 Drawing Sheets

(58) Field of Classification Search
CPC .... B65G 47/18; B65G 47/261; B65G 47/266; B65G 47/38; B65G 47/40; B65G 47/44; B65G 47/46; B65G 47/48; B65G 47/5195; B65G 47/90; B65G 47/901; B65G 37/00; B65G 2201/047; B65G 2201/0214; B65G 2203/0233; B65G 2203/0241; B65G 2207/14; B23P 19/001; B23P 19/004; H05K 13/0053; H05K 13/021; H05K 13/028
See application file for complete search history.

(56) References Cited

U.S. PATENT DOCUMENTS

| | | | |
|---|---|---|---|
| 5,145,047 A * | 9/1992 | Terracol | B23Q 7/003 198/341.02 |
| 10,350,717 B2 | 7/2019 | Shen et al. | |
| 2010/0063629 A1* | 3/2010 | Battisti | B25J 9/1697 700/259 |
| 2010/0249991 A1* | 9/2010 | Asano | B65G 47/5145 700/218 |
| 2011/0151308 A1 | 6/2011 | Yoon | |
| 2012/0233893 A1* | 9/2012 | Poole | G01B 3/04 33/679.1 |
| 2013/0299510 A1 | 11/2013 | Sugimoto et al. | |
| 2019/0022869 A1* | 1/2019 | Oowatari | B65G 47/52 |
| 2019/0023501 A1* | 1/2019 | Oowatari | B65G 47/1457 |

FOREIGN PATENT DOCUMENTS

| | | | |
|---|---|---|---|
| CN | 106271574 A * | 1/2017 | |
| CN | 106425442 A | 2/2017 | |
| CN | 106672584 A | 5/2017 | |
| CN | 108100605 A | 6/2018 | |
| CN | 109292222 A | 2/2019 | |
| CN | 208603213 U | 3/2019 | |
| CN | 209363773 U | 9/2019 | |
| JP | 3-62736 U | 6/1991 | |
| JP | 6-42031 U | 6/1994 | |
| JP | 6-247548 A | 9/1994 | |
| JP | 7-30255 Y2 | 7/1995 | |
| JP | 9-201727 A | 8/1997 | |
| JP | 11-129128 A | 5/1999 | |
| JP | 2003267526 A * | 9/2003 | |
| JP | 2014-102979 A | 6/2014 | |
| KR | 20-0350685 Y1 | 5/2004 | |
| KR | 10-0759726 B1 | 10/2007 | |
| KR | 10-2011-0072271 A | 6/2011 | |
| KR | 10-1100744 B1 | 12/2011 | |
| KR | 10-2016-0050875 A | 5/2016 | |
| KR | 10-1959282 B1 | 3/2019 | |
| KR | 10-2019-0045756 A | 5/2019 | |
| KR | 10-2019-0053458 A | 5/2019 | |
| KR | 10-2019-0071909 A | 6/2019 | |

OTHER PUBLICATIONS

JP-2003267526-A machine translation from FIT database (Year: 2025).*

JPH09-201727A translation from EPO website Espacenet.com (Year: 2025).*

International Search Report for PCT/KR2021/006799 mailed on Sep. 8, 2021.

Extended European Search for corresponding European Application No. 21818892.6, dated Jun. 21, 2023.

* cited by examiner

[FIG. 1]
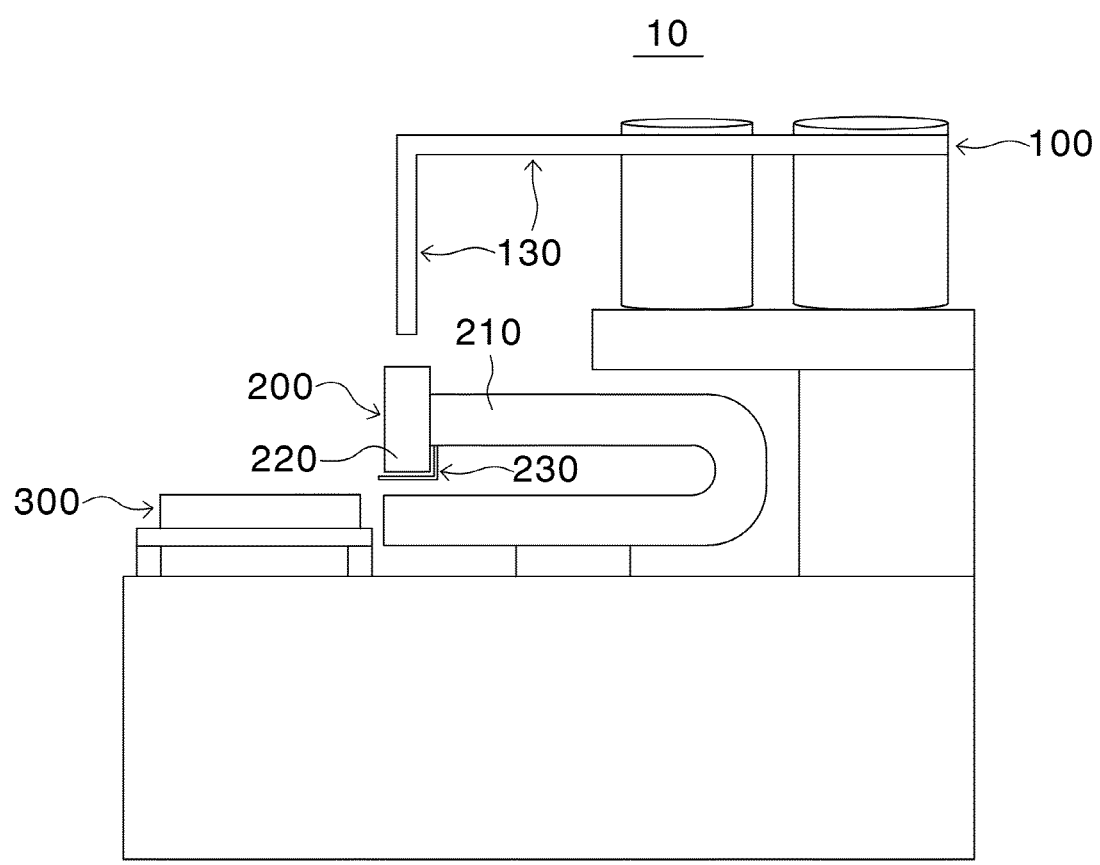

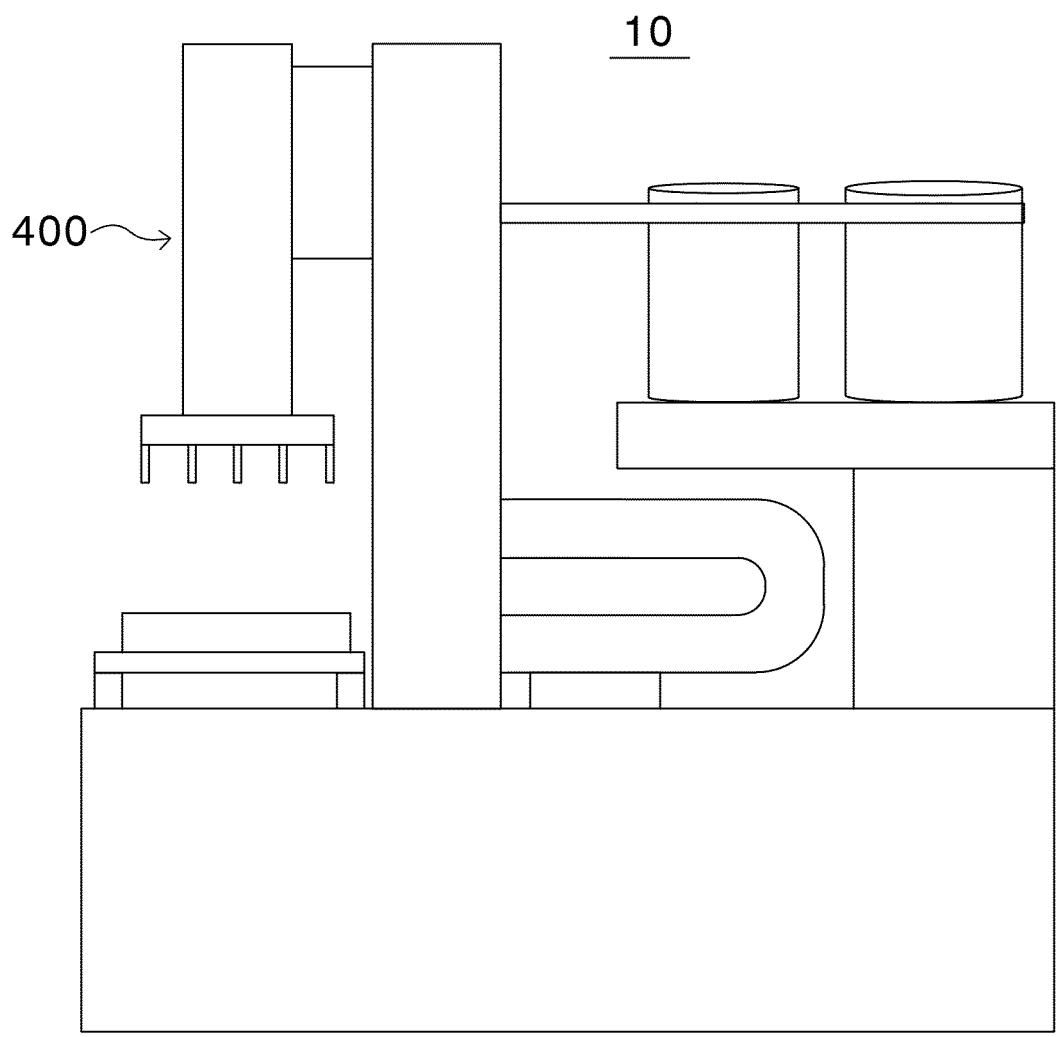

[FIG. 3]
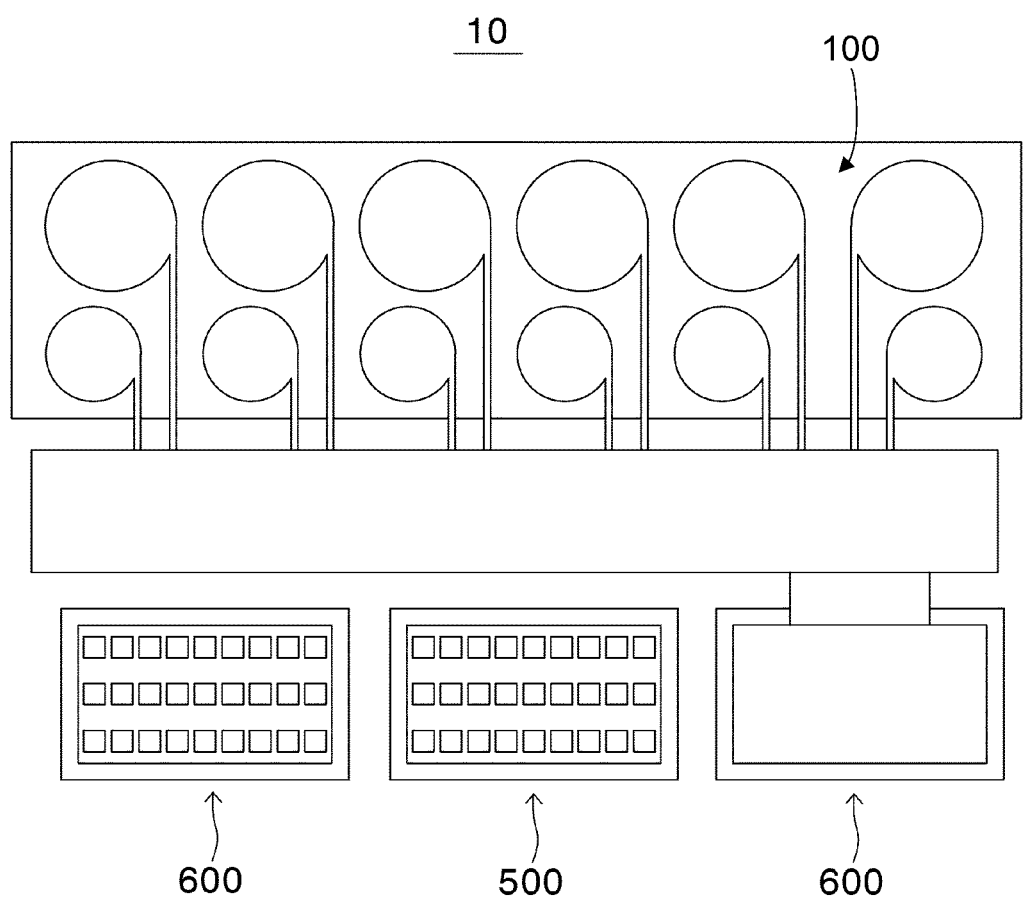

【FIG. 4】
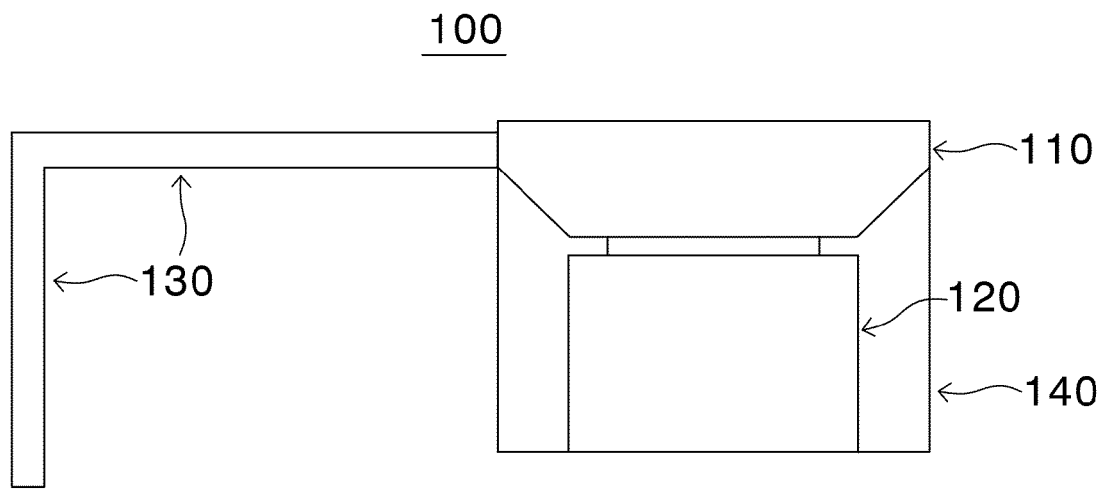

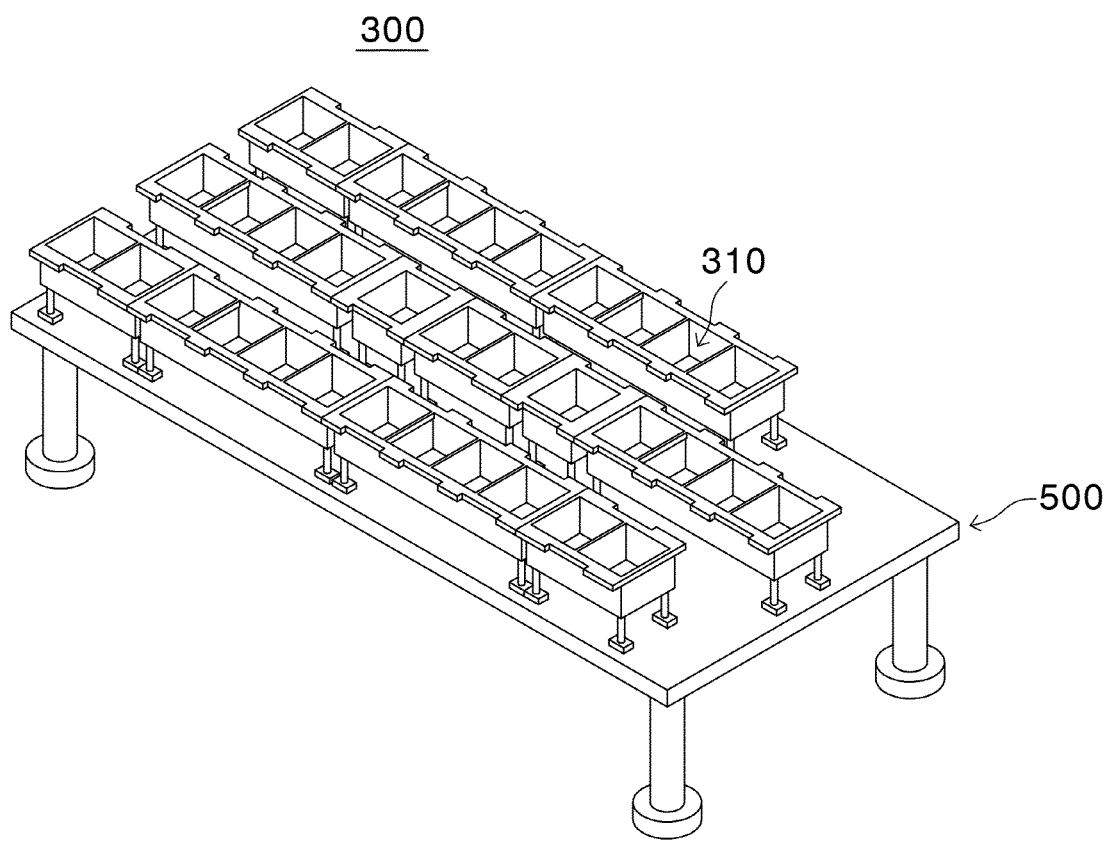
[FIG. 5]

AUTOMATIC SUPPLY SYSTEM OF BOLT AND NUT FOR BATTERY PACK ASSEMBLY

TECHNICAL FIELD

This application claims the benefit of priority to Korean Patent Application No. 2020-0066466 filed on Jun. 2, 2020, the disclosure of which is incorporated herein by reference in its entirety.

The present invention relates to a system configured to automatically supply bolts and nuts necessary for each step of a battery pack assembly process.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel-cadmium battery, a nickel-hydride battery, and a nickel-zinc battery as secondary batteries that are widely used at present. The operating voltage of a unit secondary battery cell, i.e. a unit battery cell, is about 2.0V to 5.0V. In the case in which output voltage higher than the above operating voltage is required, therefore, a plurality of battery cells may be connected to each other in series to constitute a cell module assembly. In addition, cell module assemblies may be connected to each other in series or in parallel to constitute a battery module depending on required output voltage or charge and discharge capacities. In general, a battery pack is manufactured using at least one battery module by adding an additional component.

In order to manufacture a battery pack, a process of assembling parts constituting the battery pack is necessary, and various types and quantities of bolts and nuts are necessary in order to fasten the parts in each step of such an assembly process.

In a conventional bolt and nut supply apparatus, however, all of bolts and nuts that are necessary are automatically supplied at once, and a worker sorts bolts and nuts appropriate for each assembly step one by one and then performs fastening of the sorted bolts and nuts. Even in the case in which fastening of the bolts and the nuts is omitted by mistake of the worker, therefore, the worker may not immediately recognize this and may perform the next process, whereby quality of the battery pack may be deteriorated or defect of the battery pack may occur due to poor fastening.

DISCLOSURE

Technical Problem

The present invention has been made in view of the above problems, and it is an object of the present invention to provide a system capable of automatically supplying bolts and nuts necessary for each step as much as necessary at the time of assembly of a battery pack and an automatic bolt and nut supply method using the system.

Technical Solution

An automatic bolt and nut supply system according to the present invention to accomplish the above object includes a plurality of feeders configured to store and supply the bolts and the nuts by type, a conveyor configured to convey the bolts and the nuts supplied from the plurality of feeders, a reception box configured to receive the bolts and the nuts conveyed by the conveyor, and a reception box transferor configured to transfer the reception box.

Also, in the automatic bolt and nut supply system according to the present invention, the feeder may include an alignment portion configured to store, align, and discharge the bolts and the nuts, a vibration portion configured to vibrate the alignment portion, a supply portion configured to supply the bolts and the nuts to the conveyor, and a case configured to allow the alignment portion and the vibration portion to be located therein.

Also, in the automatic bolt and nut supply system according to the present invention, the vibration portion may have an electromagnetic coil and a leaf spring, and may generate vibration such that the alignment portion discharges the bolts and the nuts.

Also, in the automatic bolt and nut supply system according to the present invention, each of the plurality of feeders may be a bowl feeder.

Also, in the automatic bolt and nut supply system according to the present invention, the reception box may be provided with a plurality of reception recesses, and the bolts and the nuts may be received in each of the plurality of reception recesses as much as necessary for a corresponding step of a battery pack assembly process.

Also, in the automatic bolt and nut supply system according to the present invention, the plurality of reception recesses may be different colors to correspond one to one to steps of the assembly process such that the plurality of reception recesses are distinguished from each other.

Also, in the automatic bolt and nut supply system according to the present invention, the plurality of reception recesses may be marked with serial numbers so as to correspond one to one to steps of the assembly process such that the plurality of reception recesses are distinguished from each other.

Also, in the automatic bolt and nut supply system according to the present invention, the conveyor may include a conveyance portion configured to store the bolts and the nuts supplied from the plurality of feeders and to supply the bolts and the nuts to the reception box, a driving portion configured to move the position of the conveyance portion, and a door portion located under the conveyance portion, the door portion being openable and closable.

In addition, an automatic bolt and nut supply method according to the present invention is a method of automatically supplying bolts and nuts necessary for each step as much as necessary by type at the time of assembly of a battery pack using the automatic bolt and nut supply system according to the present invention, the automatic bolt and nut supply method including supplying the bolts and nuts to each of the plurality of feeders by type, supplying the bolts and the nuts necessary for each step as much as necessary from the feeder to the conveyor, conveying the bolts and the nuts from the conveyor to the plurality of reception recesses of the reception box, and transferring the reception box having the bolts and the nuts received therein from a worktable to a wheel truck for movement.

Also, the automatic bolt and nut supply method may according to the present invention further include moving the wheel truck for movement, on which the reception box is seated, to the battery pack assembly process after transferring the reception box.

In addition, a battery pack according to the present invention is assembled using bolts and nuts supplied by the automatic bolt and nut supply method according to the present invention.

Advantageous Effects

In an automatic bolt and nut supply system according to the present invention, it is possible to automatically supply bolts and nuts in type and quantity required for each assembly step, whereby it is possible to prevent deterioration in quality of a battery pack or defect of the battery pack caused as a result of fastening of the bolts and the nuts being omitted by mistake of a worker.

In addition, the automatic bolt and nut supply system according to the present invention has an advantage in that bolts and nuts necessary for individual steps are supplied in a state of being distinguished from each other, and therefore it is possible to improve assembly work efficiency.

DESCRIPTION OF DRAWINGS

FIG. 1 is a side view showing an automatic bolt and nut supply system according to an embodiment of the present invention.

FIG. 2 is a side view showing the automatic bolt and nut supply system according to the embodiment of the present invention including a reception box transfer unit.

FIG. 3 is a plan view showing the automatic bolt and nut supply system according to the embodiment of the present invention.

FIG. 4 is a schematic view schematically showing components of a feeder according to the present invention.

FIG. 5 is a perspective view showing a reception box seated on a worktable according to the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, an automatic bolt and nut supply system according to the present invention will be described with reference to the accompanying drawings.

FIG. 1 is a side view showing an automatic bolt and nut supply system according to a first preferred embodiment of the present invention, FIG. 2 is a side view showing the automatic bolt and nut supply system including a reception box transfer unit, which is omitted from FIG. 1, and FIG. 3 is a plan view showing the automatic bolt and nut supply system according to the first embodiment of the present invention when viewed from above.

When describing the automatic bolt and nut supply system 10 with reference to FIGS. 1 to 3, the automatic bolt and nut supply system 10 according to the present invention includes a plurality of feeders 100 configured to store bolts and nuts by type and to supply the bolts and the nuts as much as necessary, a conveyance unit 200 configured to convey the bolts and the nuts supplied from the feeders 100 in order to supply the bolts and the nuts to a reception box, the reception box 300 having reception recesses 310 configured to receive the bolts and the nuts therein, a reception box transfer unit 400 configured to transfer the reception box 300, and a worktable 500 configured to allow the reception box 300 to be placed thereon such that the bolts and the nuts are supplied.

A feeder 100 refers to a device configured to automatically align and supply parts, and generally refers to a device configured to sort, align, and supply parts in a direction in which the parts can be used using vibration.

When describing the feeder 100 in more detail with reference to FIG. 4, the feeder 100 includes an alignment portion 110 configured to store, align, and discharge the bolts and the nuts, a vibration portion 120 configured to generate vibration and to apply the vibration to the alignment portion, a supply portion 130 serving as a passage configured to allow the bolts and the nuts of the alignment portion 110 to be discharged therealong, and a case 140 configured to wrap the alignment portion 110 and the vibration portion 120 so as to be located therein.

Here, the vibration portion 120 has an electromagnetic coil and a leaf spring, and serves to generate vibration having a desired frequency in a process in which the leaf spring is deformed as the result of operation of the electromagnetic coil and is then restored by elasticity. Due to such vibration, the parts stored in the alignment portion 110 are aligned and discharged out of the alignment portion 110.

A representative example of a feeder using vibration is a bowl feeder. The bowl feeder is a feeder configured to have a structure in which a bowl corresponding to the alignment portion 110 and a vibration portion 120 configured to generate vibration are coupled to each other. Depending on the shape thereof, the bowl feeder is classified as a cylindrical bowl feeder, a stepped bowl feeder, or a plate type bowl feeder.

It is preferable for the feeders 100 to be provided in numbers corresponding to types of bolts and nuts used in the battery pack assembly process such that one feeder 100 can separately store only one kind of bolts or nuts.

Although the feeder using vibration has been described above by way of example, the automatic bolt and nut supply system 10 according to the present invention is not limited thereto, and any of various known feeders capable of performing the same function may be used.

Meanwhile, the conveyance unit 200 includes a conveyance portion 220 configured to store the bolts and the nuts supplied from the feeders 100 and to supply the bolts and the nuts to the reception recesses 310 of the reception box 300, the conveyance portion being open at upper and lower parts thereof; a driving portion 210 connected to the conveyance portion 220, the driving portion being configured to drive the conveyance portion 220 forwards, rearwards, leftwards, and rightwards; and an openable and closable door portion 230 located under the conveyance portion 220, the door portion being configured to remain closed until the conveyance portion 220 moves above a corresponding one of the reception recesses 310 of the reception box 300 after the bolts and the nuts are supplied from the feeders 100 and to be opened when the bolts and the nuts are supplied to the reception box 300.

When describing the reception box 300 in detail with reference to FIG. 5, the reception box 300 is configured to have a structure in which a plurality of reception recesses 310 configured to receive the bolts and the nuts therein is connected to each other. The number of reception recesses 310 provided in one reception box 300 may be variously selected depending on types and quantities of bolts and nuts necessary in the battery pack assembly process. Individual reception recesses 310 may be coupled to each other as much as necessary to constitute a reception box 300, or a desired number of reception recesses 310 may be formed in a frame formed as one body to manufacture a reception box.

Meanwhile, the shape of the reception recesses 310 is not limited to what is shown in FIG. 5. The reception recesses may be formed in any shape as long as the reception recesses are capable of stably receiving the bolts and the nuts therein and are usable in the assembly process.

In addition, the reception recesses 310 of the reception box 300 may be painted with different colors so as to correspond one to one to assembly steps such that the reception recesses are distinguished from each other, or may be marked with serial numbers, such as numerals or letters, such that the reception recesses are distinguished from each other. Since a correct quantity of bolts and nuts can be supplied in each assembly step through the above methods, it is possible to prevent defects of a battery pack from occurring as a result of a worker omitting fastening by mistake during the assembly process or omitted bolts or nuts that have not been recognized by the worker entering the battery pack during work. In addition, since the bolts and the nuts necessary for individual steps are distinguished from each other, it is possible to improve work efficiency, and therefore it is possible to reduce battery pack assembly time.

When describing the reception box transfer unit 400 with reference to FIGS. 2 and 3, the reception box transfer unit 400 is a device configured to transfer the reception box 300, before supply of the bolts and the nuts, on a wheel truck 600 for movement to a predetermined position of the worktable 500 and to transfer the reception box 300, after supply of the bolts and the nuts, on the worktable 500 to another wheel truck 600 for movement in an empty state.

When describing a method of automatically supplying bolts and nuts using the automatic bolt and nut supply system 10 according to the present invention described above, first, bolts and nuts are supplied to the plurality of feeders 100 by type, and subsequently, each feeder 100 supplies bolts and nuts necessary for each step to the conveyance portion 220 of the conveyance unit 200. The bolts and the nuts are conveyed and supplied to a corresponding one of the reception recesses 310 of the reception box 300 by the conveyance unit 200. After supply of necessary bolts and nuts is completed, the reception box 300 is transferred from the worktable 500 to the wheel truck 600 for movement by the reception box transfer unit 400. Subsequently, the wheel truck 600 for movement, on which the reception box 300 is seated, is moved to a battery pack assembly process such that the bolts and the nuts are used to fasten parts in each step of the battery pack assembly process.

A battery pack assembled through the above process may be used as a power supply source for an electric vehicle (EV), a hybrid electric vehicle (HEV), a plug-in hybrid electric vehicle (P-HEV), or an energy storage system (ESS).

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

10: Automatic bolt and nut supply system
100: Feeder
110: Alignment portion
120: Vibration portion
130: Supply portion
140: Case
200: Conveyance unit
210: Driving portion
220: Conveyance portion
230: Door portion
300: Reception box
310: Reception recess
400: Reception box transfer unit
500: Worktable
600: Wheel truck for movement

The invention claimed is:

1. An automatic bolt and nut supply system configured to automatically supply bolts and nuts necessary for each step of a battery pack assembly by type at a time of assembly of the battery pack, the automatic bolt and nut supply system comprising:

a plurality of feeders, each feeder configured to store one type of bolt or nut necessary for the battery pack assembly and supply the bolts and the nuts by type to a supply passage thereof;

a conveyor configured to receive and convey the bolts and the nuts supplied from the supply passages of the plurality of feeders;

a reception box configured to receive the bolts and the nuts conveyed by the conveyor; and a reception box transferor configured to transfer the reception box, wherein the conveyor comprises:

a container having a sidewall with an open top and an open bottom;

a driver configured to move a position of the container between the plurality of feeders and the reception box; and a door located under the bottom of the container, the door being openable and closable so that the container can receive the bolts and nuts from the supply passages of the plurality of feeders when the door is closed and supply the stored bolts and nuts to the reception box when opened.

2. The automatic bolt and nut supply system according to claim 1, wherein each feeder of the plurality of feeders comprises:

an aligner configured to store, align, and discharge the bolts and the nuts;

a vibrator configured to vibrate the alignment portion aligner;

a supplier configured to supply the bolts and the nuts to the conveyor; and a case configured to allow the aligner and the vibrator to be located therein.

3. The automatic bolt and nut supply system according to claim 2, wherein the vibrator has an electromagnetic coil and a leaf spring, and generates vibration such that the aligner discharges the bolts and the nuts.

4. The automatic bolt and nut supply system according to claim 1, wherein each of the plurality of feeders is a bowl feeder.

5. The automatic bolt and nut supply system according to claim 1, wherein the reception box is provided with a plurality of reception recesses, and the bolts and the nuts are received in each of the plurality of reception recesses as much as necessary for a corresponding step of a battery pack assembly process.

6. The automatic bolt and nut supply system according to claim 5, wherein the plurality of reception recesses are different colors to correspond one to one to steps of the assembly process such that the plurality of reception recesses are distinguished from each other.

7. The automatic bolt and nut supply system according to claim 5, wherein the plurality of reception recesses are marked with serial numbers so as to correspond one to one to steps of the assembly process such that the plurality of reception recesses are distinguished from each other.

8. The automatic bolt and nut supply system according to claim 1, wherein the conveyor moves horizontally.

9. An automatic bolt and nut supply method of automatically supplying bolts and nuts necessary for each step as much as necessary by type at a time of assembly of a battery pack using the automatic bolt and nut supply system according claim 1, the automatic bolt and nut supply method comprising:
supplying the bolts and nuts to each of the plurality of feeders by type;
supplying the bolts and the nuts necessary for each step as much as necessary from the feeder to the conveyor;
conveying the bolts and the nuts from the conveyor t the reception box; and
transferring the reception box having the bolts and the nuts received therein from a worktable to a wheel truck for movement.

10. The automatic bolt and nut supply method according to claim 9, further comprising moving the wheel truck for movement, on which the reception box is seated, to the battery pack assembly process after transferring the reception box.

* * * * *